(12) United States Patent
Tsuda et al.

(10) Patent No.: US 9,304,661 B2
(45) Date of Patent: Apr. 5, 2016

(54) METHOD OF DISPLAYING IMAGE

(75) Inventors: Munetaka Tsuda, Kyoto (JP); Yasuto Kakimoto, Kyoto (JP); Ryoma Aoki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 649 days.

(21) Appl. No.: 13/474,140

(22) Filed: May 17, 2012

(65) Prior Publication Data

US 2013/0214993 A1    Aug. 22, 2013

(30) Foreign Application Priority Data

Feb. 20, 2012  (JP) ................................ 2012-034219

(51) Int. Cl.
　　*G06F 3/0484*　　(2013.01)
　　*G09G 5/14*　　(2006.01)
　　*G06F 3/0485*　　(2013.01)

(52) U.S. Cl.
　　CPC ............ *G06F 3/0484* (2013.01); *G06F 3/0485* (2013.01); *G09G 5/14* (2013.01); *G06F 2203/04803* (2013.01); *G09G 2340/04* (2013.01); *G09G 2340/0464* (2013.01); *G09G 2340/14* (2013.01)

(58) Field of Classification Search
　　None
　　See application file for complete search history.

(56) References Cited

U.S. PATENT DOCUMENTS

| | | | |
|---|---|---|---|
| 5,414,810 A * | 5/1995 | Doyle et al. ................. | 715/804 |
| 2004/0216036 A1 | 10/2004 | Chu et al. | |
| 2006/0005124 A1 * | 1/2006 | Speicher ..................... | 715/514 |
| 2011/0228331 A1 | 9/2011 | Yamada | |
| 2012/0029661 A1 * | 2/2012 | Jones et al. ................. | 700/17 |

FOREIGN PATENT DOCUMENTS

| | | |
|---|---|---|
| JP | H10-11040 | 1/1998 |
| JP | 2000-305686 | 11/2000 |
| JP | 2001-042985 | 2/2001 |
| JP | 2005-539336 | 12/2005 |
| JP | 2008-176895 | 7/2008 |
| JP | 2010-079412 | 4/2010 |
| JP | 2011-197737 | 10/2011 |

* cited by examiner

*Primary Examiner* — Kenneth B Lee, Jr.
(74) *Attorney, Agent, or Firm* — Nixon & Vanderhye, P.C.

(57) ABSTRACT

An information-processing device includes: a first display controller that causes a display to display multiple first images in a predetermined arrangement; a second display controller that, upon receipt of a first operation for one of the multiple first images, changes at least part of an arrangement of the multiple first images from the predetermined arrangement, and causes a second image associated with the first image, for which the first operation was received, to be displayed on the display so as not to overlap the multiple first images; and an execution unit that, upon receipt of a second operation for the second image while the second image is displayed, executes a process in accordance with the second operation.

17 Claims, 6 Drawing Sheets

METHOD OF DISPLAYING IMAGE

CROSS-REFERENCE TO RELATED APPLICATIONS

This application is based on and claims priority under 35 U.S.C. 119 from Japanese Patent Application No. 2012-034219, which was filed on Feb. 20, 2012.

TECHNICAL FIELD

The present invention relates to a GUI (Graphical User Interface).

BACKGROUND ART

As dialog boxes, modal dialog boxes and modeless dialog boxes (or non-modal dialog boxes) are known, for example. A modal dialog box is a dialog box configured such that, until a user performs an operation for the dialog box and closes (or causes to disappear) the dialog box, other operations are blocked. On the other hand, a modeless dialog box is a dialog box configured such that, without performing an operation for the dialogue box, a user can perform other operations.

SUMMARY

According to an aspect of the present invention, there is provided an information-processing device including: a first display controller that displays multiple first images in a predetermined arrangement on a display; a second display controller that, upon receipt of a first operation for one of the multiple first images, changes at least part of an arrangement of the multiple first images from the predetermined arrangement, and displays a second image associated with the first image, for which the first operation was received, on the display so as not to overlap the multiple first images; and an execution unit that, upon receipt of a second operation for the second image while the second image is displayed, executes a process in accordance with the second operation.

BRIEF DESCRIPTION OF THE DRAWINGS

Exemplary embodiments of the present invention will now be described in detail based on the following figures, wherein.

DETAILED DESCRIPTION

Figure 1:
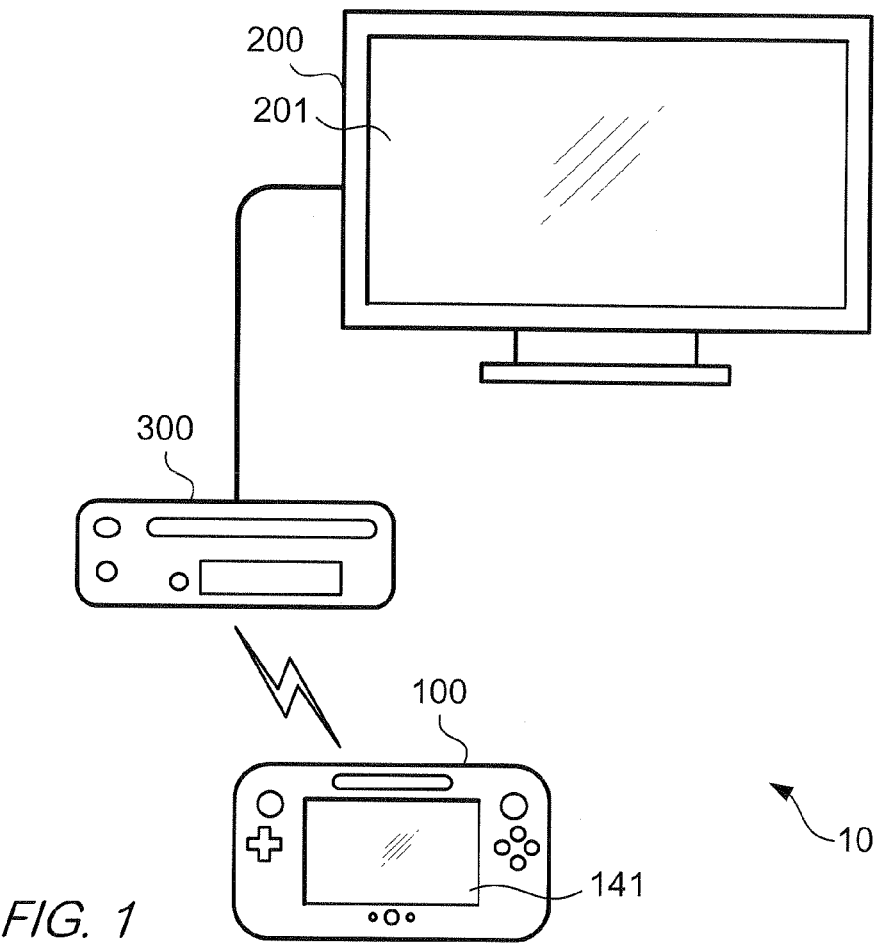
FIG. 1 is a diagram showing a configuration of a display system.

FIG. 1 is a diagram showing a configuration of display system 10, which is an exemplary embodiment of the present invention. Display system 10 is a system for displaying a variety of images in accordance with operations performed by a user. An image displayed in display system 10 is, for example, an image of a game or a webpage, but may be another image.

Display system 10 is configured to include controller 100, monitor 200, and main device 300. It is to be noted, however, that display system 10 may be used without use of monitor 200.

Controller 100 is a terminal on which an image is displayed, and is held by a user to perform various operations. Controller 100 herein is a portable display that has display region 141 and can be held and operated by a user. It is to be noted that controller 100 not only presents information visually by displaying images, but also may present audible or tactile information by using sound or vibration.

Monitor 200 is a device for displaying an image, and may be, for example, a television set for receiving a television broadcast. In this explanation, monitor 200 is a stationary-type display. It is assumed that monitor 200 has display region 201 having a larger size than display region 141 of controller 100, though display region 201 may be the same size as or smaller than display region 141 of controller 100. Further, display region 201 of monitor 200 and display region 141 of controller 100 do not have to have the same aspect ratio.

Main device 300 is an information-processing device for controlling operation of controller 100 and monitor 200. To achieve the purpose, controller 300 is connected to each of controller 100 and monitor 200 via wired or wireless communication. It is assumed here that main device 300 conducts wireless communication with controller 100 and conducts wired communication with monitor 200, though the communication may be performed in another manner.

Figure 2:
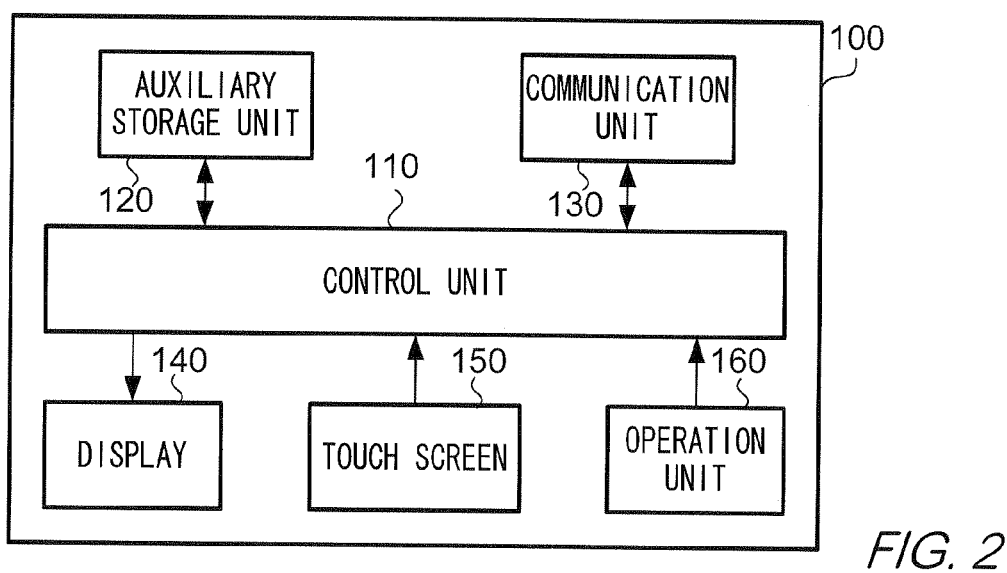
FIG. 2 is a block diagram showing a hardware configuration of a controller.

FIG. 2 is a block diagram showing a hardware configuration of controller 100. Controller 100 includes control unit 110, auxiliary storage unit 120, communication unit 130, display 140, touch screen 150, and operation unit 160.

Control unit 110 is a means for controlling operations of various units of controller 100. Control unit 110 includes a processing device such as a CPU (Central Processing Unit), a memory serving as a main memory device, an input/output interface for communicating information with various units of controller 100, and so on, and executes a program(s) to control display of images or data transmission and reception to and from main device 300. Further, control unit 110 may include a codec for compressing image data to be sent to main device 300 and expanding image data received from main device 300. The format for compression and expansion performed by the codec is H.264, for example, though the format is not particularly limited.

Auxiliary storage unit 120 is a means for storing data used by control unit 110. Auxiliary storage unit 120 is a flash memory, for example. Auxiliary storage unit 120 is capable of storing data relating to bookmarks, which will be described later, and other data. It is to be noted that auxiliary storage unit 120 may be configured to include a removable storage medium such as a so-called memory card.

Communication unit 130 is a means for communicating with main device 300. Communication unit 130 includes an antenna or the like for communicating with main device 300 wirelessly.

Display 140 is a means for displaying an image. Display 140 includes a display panel having pixels formed by liquid crystal elements or organic EL (electroluminescence) elements, and a drive circuit for driving the display panel, and displays, in display region 141, an image in accordance with image data provided from control unit 110.

Touch screen 150 is a means for receiving an operation performed by a user, and generating and supplying coordinate information that represents a position in display region 141. Touch screen 150 includes a sensor disposed to overlap display region 141, and a control circuit for generating coordinate information representing a position detected by the sensor and providing the coordinate information to control unit 110. Touch screen 150 may be of resistive type, or may be of another type such as capacitive type. Further, touch screen 150 may be a so-called multi-touch screen, which can detect a user's touch at multiple positions at the same time. It is to be noted that a user may operate touch screen 150 with her/his finger, though the user may operate touch screen 150 using a pen-shaped tool such as a stylus (touch pen).

In the following description, an operation received by touch screen 150 will be referred to as a "touch operation." Further, it is assumed that there are at least two types of touch operation; namely, a "tap operation" and a "drag operation." A tap operation refers to a touch operation in which a user's finger or the like is caused to touch a position in display region 141 and then leave the screen within a prescribed time without change in the touched position. Normally, a tap operation is an operation of touching instantaneously a certain position in display region 141. On the other hand, a drag operation refers to a touch operation in which a position touched by a user's finger or the like changes over time.

Touch screen 150 provides software keys in cooperation with display 140. A software key is a key that is provided in display region 141 by a software process. Unlike a hardware key, the position of a software key is changeable, and display/hiding of a software key can be switched.

Operation unit 160 is another means for receiving an operation performed by a user. Operation unit 160 includes hardware keys that can be pressed and switches, and provides control unit 110 with operation information (e.g., information indicating whether each key is pressed) in accordance with an operation performed by a user. It is to be noted here that a hardware key is a key provided at a predetermined position of controller 100, and may also be referred to as a physical key.

Figure 3:
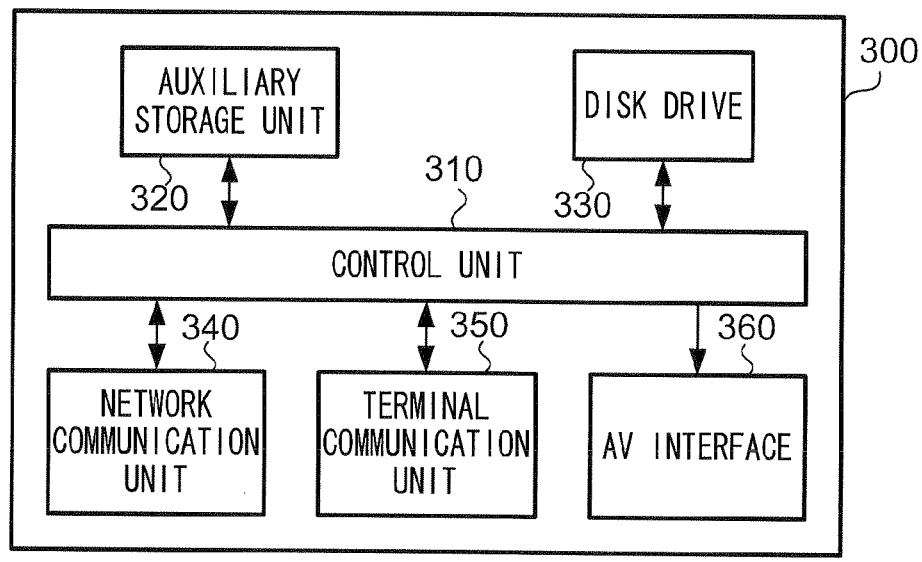
FIG. 3 is a block diagram showing a hardware configuration of a main device.

FIG. 3 is a block diagram showing a hardware configuration of main device 300. Main device 300 includes control unit 310, auxiliary storage unit 320, disk drive 330, network communication unit 340, terminal communication unit 350, and AV (Audio and Visual) interface 360.

Control unit 310 is a means for controlling operations of various units of main device 300, and corresponds to a "computer" in the present invention. Control unit 110 includes a processing device such as a CPU, a GPU (Graphics Processing Unit), a DSP (Digital Signal Processor) or the like, a memory serving as a main memory device or a VRAM (Video Random Access Memory), an input/output interface for communicating information with various units of main device 300, and so on, and executes a program(s) to control generation of image data to be transmitted to controller 100 and monitor 200. The programs that can be executed by control unit 310 include a game program, a browser program for browsing web pages, and so on, such programs being described later. Further, control unit 310 may include a codec for compressing image data to be sent to controller 100 or monitor 200 and expanding image data received from controller 100.

Auxiliary storage unit 320 is a means for storing data used by control unit 310. Auxiliary storage unit 320 is a flash memory or a hard disk, for example, but may include a removable storage medium such as a memory card. Auxiliary storage unit 320 is capable of storing programs to be executed by control unit 310 and data acquired via network communication unit 340 or terminal communication unit 350.

Disk drive 330 is a means for reading data stored in an optical disk (optical storage medium). The optical disk may store data necessary for playing a game, such as a game program, for example. It is to be noted that disk unit 330 may be configured to read data stored in another storage medium such as a magneto-optical disk or a semiconductor memory.

Network communication unit 340 is a means for communicating via a network such as the Internet. The communication performed by network communication unit 340 may be wired or wireless communication. Network communication unit 340 receives data from an external server device or transmits data thereto in accordance with instructions from control unit 310.

Terminal communication unit 350 is a means for communicating with controller 100. In a case where a controller other than controller 100 is used, terminal communication unit 350 may communicate with the other controller. The wireless communication performed by terminal communication unit 350 may utilize any communication technology such as Wi-Fi, Bluetooth, or infrared communication.

AV interface 360 is a means for supplying to monitor 200 image data, sound data, or the like. AV interface 360 includes one or more interfaces such as an HDMI (High-Definition Multimedia Interface: registered trademark) terminal or the like.

Figure 4:
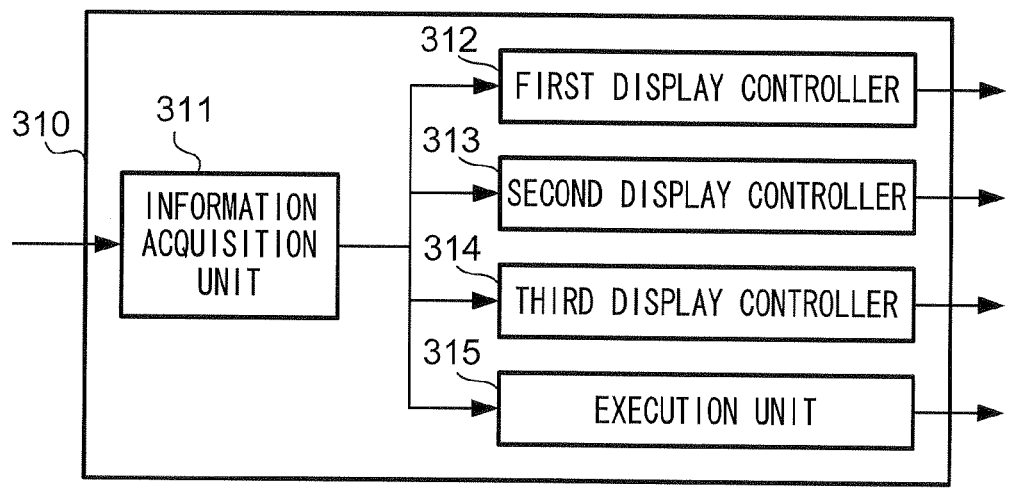
FIG. 4 is a block diagram showing a principal functional configuration of the main device.

FIG. 4 is a block diagram (functional block diagram) showing a principal functional configuration of main device 300. As means for enabling display of images on controller 100 and monitor 200, main device 300 includes information acquisition unit 311, first display controller 312, second display controller 313, third display controller 314, and execution unit 315. The functions of these units are realized by execution of one or more programs by control unit 310 of main device 300. Namely, the functions of these units are realized by a software process(es).

Information acquisition unit 311 is a means for acquiring operation information relating to an operation performed by a user. In addition to information provided by operation unit 160, information acquired by information acquisition unit 311 includes coordinate information provided by touch screen 150. Information acquisition unit 311 acquires operation information transmitted from controller 100 via terminal communication unit 350, and recognizes an operation performed by a user indicated by the acquired operation information.

First display controller 312, second display controller 313, and third display controller 314 are means for controlling display of an image. These units can control display of an image by controller 100 and display of an image by monitor 200 based on the operation information acquired by information acquisition unit 311. These units control display of an image by controller 100 and monitor 200 by generating necessary image data, and transmitting the generated image data via terminal communication unit 350 and AV interface 360. It is to be noted that in a case where an image is displayed only on controller 100 and not on monitor 200, first display controller 312, second display controller 313, and third display controller 314 may control only display of an image by controller 100.

First display controller 312 is a means for causing multiple first images in a predetermined arrangement. In this embodiment, it is assumed that each first image is an image having a predetermined shape and representing a bookmark (or a so-called "favorite"). In the following description, a list-view of bookmarks caused to be displayed by first display controller 312 will be referred to as a "favorites list."

Second display controller 313 is a means for, when, in a state where multiple first images are caused to be displayed in a predetermined arrangement by first display control means 312, a predetermined operation for one of the multiple first images is received, causing a second image associated with this first image to be displayed. It is assumed here that the second image is an image for representing predetermined information corresponding to a bookmark. When causing the second image to be displayed, second display controller 313 changes the arrangement of the first images, such that the second image does not overlap the first images.

Third display controller 314 is a means for, in response to a predetermined operation, causing the second image, which has been caused to be displayed by second display controller 313, to disappear. Further, when causing the second image to disappear, third display controller 314 causes the display positions of the first images, such that the arrangement of the first images, which has been changed as a result of displaying of the second image, revert to the original arrangement.

Execution unit 315 is a means for executing a process in accordance with an operation performed by a user. Execution unit 315 executes a predetermined process based on operation information acquired by information acquisition unit 311. For example, execution unit 315 executes additional display control or data communication relating to display control performed by first display controller 312, second display controller 313, or third display controller 314.

The foregoing is a description of the configuration of display system 10. In this configuration, main device 300 causes at least one of controller 100 and monitor 200 to display an image. Depending on a user operation and/or a type of an image to be displayed, main device 300 may cause only one of controller 100 and monitor 200 to display an image or may cause each of controller 100 and monitor 200 to display an image. It is to be noted that, in a case where an image is displayed on each of controller 100 and monitor 200, main device 300 may cause the same image to be displayed on controller 100 and monitor 200, or may cause different images to be displayed on controller 100 and monitor 200.

For example, in a case where a game is played and there are multiple users such as family members or friends, a mode of use may be assumed in which a particular user views and operates controller 100, while the other users check the progress of the game using monitor 200. In such a case, if there are multiple controllers 100 or there is a controller(s) other than controller 100, multiple users can participate in the game.

Further, by using display system 10, a user not only can play a game but also can browse webpages. In doing so, if the user wishes to view an image of a game or a webpage with another user, the user may perform an operation such that the image is displayed on each of controller 100 and monitor 200. On the other hand, if there are no other users, and the user views the image alone, it is possible to cause the image to be displayed on only controller 100.

Figure 5:
FIG. 5 is a diagram showing an example of a favorites list.

FIG. 5 is a diagram showing an example of an image displayed in display region 141 of controller 100 in this exemplary embodiment, and shows an example of the aforementioned "favorites list." In this example, the favorites list includes bookmark icons Im1A-Im1L. Each of bookmark icons Im1A-Im1L is an image associated with a predetermined URL (Uniform Resource Locator), and corresponds to a "first image" of the present invention. It is to be noted that in the following description, when bookmark icons Im1A-Im1L are not distinguished from one another, and explanation is given of a general feature relating to such icons, the bookmark icons will be referred to as "bookmark icons Im1." In the example shown in FIG. 5, bookmark icons Im1 are displayed in an arrangement composed of two columns arranged horizontally and six rows arranged vertically.

Figure 6:
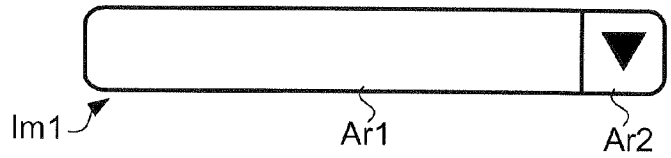
FIG. 6 is a diagram for explaining parts of a bookmark icon.

FIG. 6 is a diagram for explaining parts of bookmark icon Im1. As shown in this drawing, bookmark icon Im1 has a display region divided into link region Ar1 and option region Ar2. Link region Ar1 is a region functioning as a link (hyperlink) to a URL corresponding to bookmark icon Im1. On the other hand, option region Ar2 does not function as a link to a URL, and serves as a region for receiving an operation for displaying a dialog box. Displayed in link region Ar1 are, for example, display name (name, title, etc.) assigned to the webpage corresponding to the URL, and an icon image assigned to the webpage. The icon image is a so-called "favicon (favorites icon)," for example, but may be another image. The URL, display name, and icon image are stored in auxiliary storage unit 120 (or auxiliary storage unit 320) as setting information relating to a bookmark.

A user is capable of accessing a desired webpage with ease by performing a touch operation on the favorites list. More specifically, by performing a tap operation on link region Ar1 of bookmark icon Im1, a user can cause a webpage corresponding to bookmark icon Im1 to be displayed.

Further, a user can edit the favorites list. In this description, edition of a favorites list refers to deletion of a bookmark, changing of a display name or a URL, for example. By performing a tap operation on option region Ar2 of bookmark icon Im1, a user can achieve changing relating to a bookmark corresponding to bookmark icon Im1.

Figure 7A:
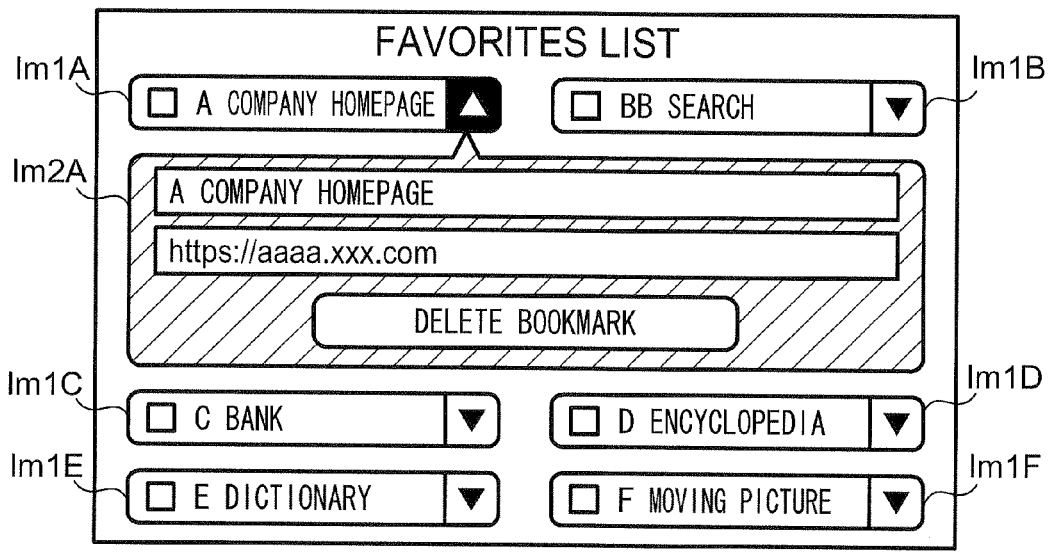
FIGS. 7A and 7B are diagrams showing examples of a screen for editing a favorites list.
Figure 7B:
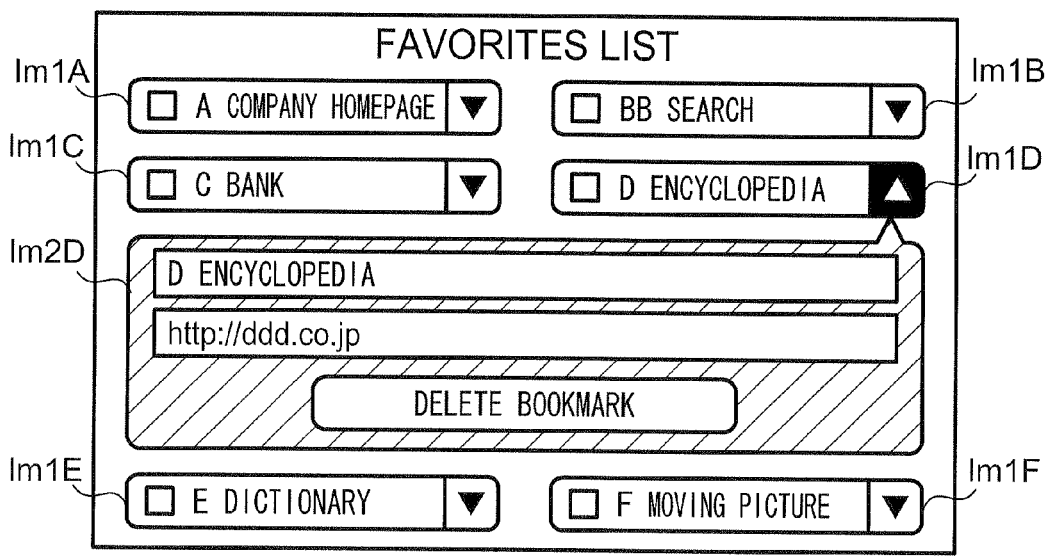

FIGS. 7A and 7B are diagrams showing examples of a screen displayed in display region 141 of controller 100, and specifically shows an example of a screen for editing a favorites list. The screen shown in FIG. 7A is a screen displayed when editing is to be performed with regard to bookmark icon Im1A, i.e., a screen displayed when a tap operation is performed for option region Ar2 of bookmark icon Im1A. In this example, dialog box Im2A is displayed in the favorites list. On the other hand, the screen shown in FIG. 7B is a screen displayed when editing is to be performed with regard to bookmark icon Im1D, i.e., a screen displayed when a tap operation is performed for option region Ar2 of bookmark icon Im1D. In this example, dialog box Im2D is displayed in the favorites list. Dialog boxes Im2A and Im2D each correspond to a "second image" in the present invention. It is to be noted that a dialog box is displayed in response to a predetermined operation performed for bookmark icon Im1 other than bookmark icons Im1A and Im1D.

Upon receipt of a tap operation, controller 100 may cause at least part of bookmark icon Im1, for which the tap operation was received, to be displayed in a manner different from that in which the other bookmark icons Im1 are displayed. For example, in FIG. 7, the color in option region Ar2 of each of bookmark icons Im1A and Im1D is inversed, and a triangle figure in this region is displayed upside down. In this way, it is possible to show more clearly the bookmark icon that corresponds to the displayed dialog box. In the following description, the bookmark icon displayed in this manner, namely, the bookmark icon of which dialog box is being displayed, may be referred to as a "selected bookmark icon."

In each dialog box Im2A, Im2D, a URL and a display name of a bookmark are displayed. The URL and the display name can be changed by a touch operation (or an operation of a key of operation unit 160) performed by a user. Further, displayed in each of dialog boxes Im2A and Im2D is a deletion button for deleting the bookmark. If a tap operation is performed on this deletion button, corresponding bookmark icon Im1 (in this case, bookmark icon Im1A or Im1D) will be deleted from the favorites list.

Dialog boxes Im2A and Im2D are displayed in the vicinity of (in this example, immediately below) bookmark icons Im1A and Im1D, respectively. For example, dialog box Im2A is displayed such that dialog box Im2A is sandwiched between bookmark icon Im1A and bookmark icon Im1C. At this time, controller 100 changes the arrangement of bookmark icons Im1, such that dialog box Im2A does not overlap any of bookmark icons Im1A-Im1L. In this example, the display positions of bookmark icons Im1A and Im1B do not change, but the display positions of the other bookmark icons Im1C-Im1L change, such that these icons move away from bookmark icons Im1A and Im1B. This makes it possible to prevent dialog box Im2A from overlapping bookmark icon Im1 and interfering display of bookmark icons Im1.

It is to be noted that the manner of movement of the bookmark icons is not limited to this example. For example, control unit 310 may cause a dialog box to be displayed above the selected bookmark icon. It is also to be noted that bookmark icons Im1G-Im1L, which are not shown in FIG. 7, are scrolled out of view, and are brought back into view when a user causes dialog box Im2A to disappear or performs a drag operation therefor.

In this exemplary embodiment, a user can cause a dialog box to disappear in the following two methods. In the first method, a user performs a tap operation again on option region Ar2 of bookmark icon Im1 on which a tap operation has been performed already (namely, an option region that is inverse-displayed in FIG. 7). In the second method, a user performs a tap operation in a region where no bookmark icons nor dialog boxes are displayed. It is to be noted that a dialog box may include an image for causing the dialog box to disappear (a so-called close button), whereby the dialog box is caused to disappear when a tap operation is performed on the image.

It is to be noted that without causing a dialog box to disappear, a use is capable of performing an operation other than those for the dialog box. For example, in a state when a dialog box is displayed, a user can perform a tap operation on link region Ar1 of bookmark icon Im1, whereby a webpage corresponding to this icon is displayed. Further, in a state where a dialog box is displayed, a user can perform a drag operation for causing the dialog box to move to a desired position, whereby the favorites list is scrolled accordingly.

Figure 8:
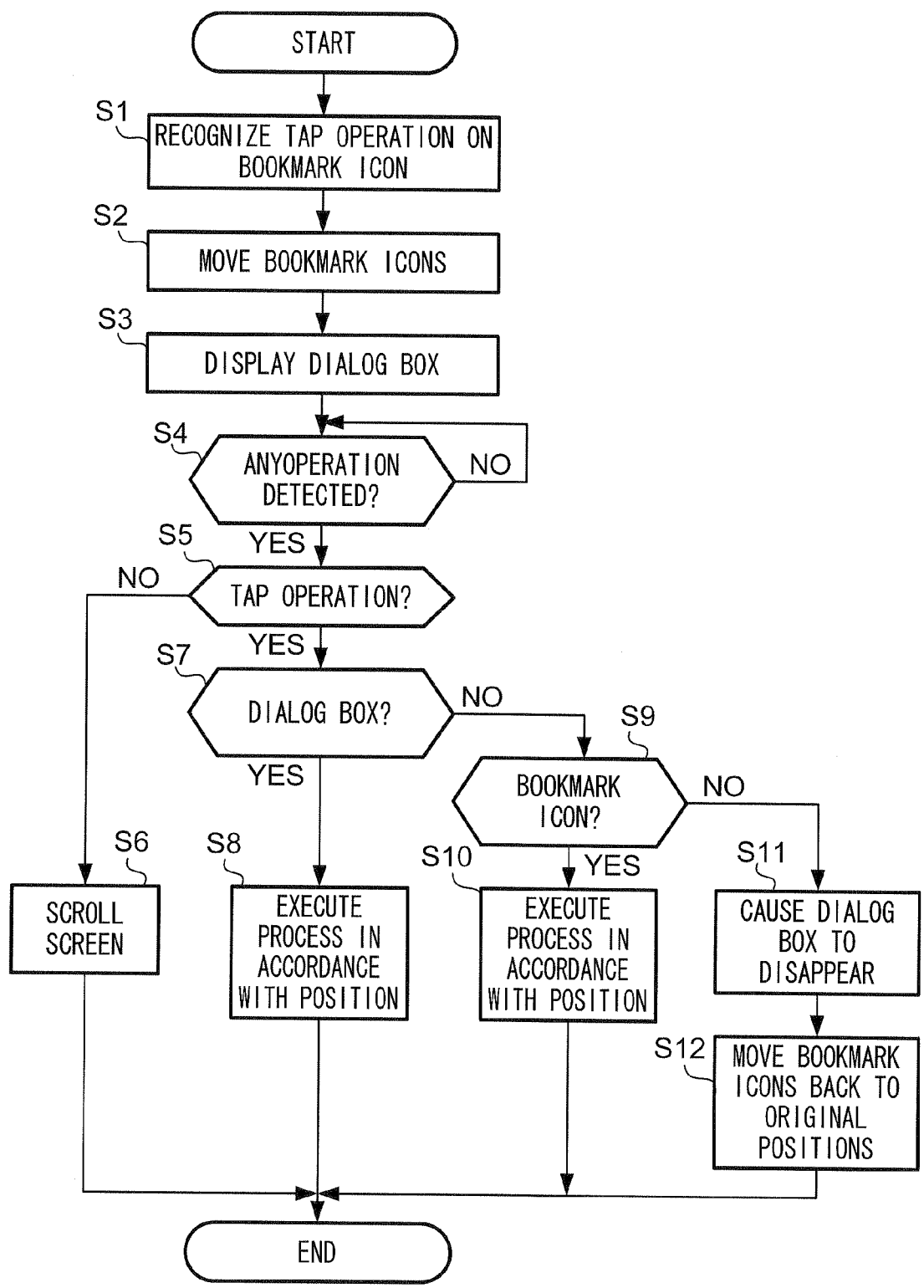
FIG. 8 is a flowchart showing a process executed by the main device.

FIG. 8 is a flowchart showing a process executed by main device 300. Specifically, FIG. 8 shows a process executed when a dialog box is displayed in display region 141 of controller 100. Main device 300 receives operation information from controller 100 and transmits image data to controller 100 to achieve control of an image displayed in display region 141. For convenience of explanation, only a tap operation and a drag operation will be described here.

To cause a dialog box to be displayed, a user needs to select one of the bookmark icons. Selection of a bookmark icon is achieved by performing a tap operation. When a user performs a tap operation on a bookmark icon, control unit 310 of main device 300 acquires information representative of the operation (hereinafter referred to as operation information), and recognizes a tap operation performed on a bookmark icon (step S1).

After recognizing a tap operation performed on a bookmark icon, control unit 310 causes the bookmark icons other than the bookmark icon on which the tap operation was performed to move, and causes a dialog box corresponding to the bookmark icon to be displayed (steps S2 and S3). Control unit 310 causes an image to be displayed on controller 100 by generating image data for displaying a dialog box and supplying the image data via terminal communication unit 350. Controller 100 displays, in display region 141, an image in accordance with the received image data. The image displayed at this time may be images for animation display in which bookmarks and/or a dialog box move gradually.

In step S2, control unit 310 determines bookmark icon(s) of which display position is to be moved, based on the bookmark icon selected by the user and the display size of the dialog box corresponding to the selected bookmark icon. In the example shown in FIG. 7, control unit 310 does not move the bookmark icon selected by the user (in FIG. 7A, Im1A) and the bookmark icon(s) (in FIG. 7A, Im1B) displayed at the same height as or above the selected bookmark icon, while moving the bookmark icons displayed below the selected bookmark icon, such that the bookmark icons do not overlap the dialog box. In this way, since the display position of the selected bookmark icon does not change, while the display positions of bookmark icons other than the selected bookmark icon change, it is possible to prevent the selected bookmark icon from being scrolled out of view. It is to be noted that in this exemplary embodiment, it is assumed that a dialog box has a predetermined size. In this case, an amount of movement (or a travel distance) of a bookmark icon also is a predetermined distance.

Subsequently, control unit 310 waits for a predetermined operation performed by a user. Namely, control unit 310 determines whether operation information is acquired (step S4), and repeats this determination until operation information is acquired. Upon acquisition of operation information, control unit 310 executes different processes depending on an operation indicated by the acquired operation information. It is to be noted that the algorithm described below is a mere example, and the method of distinguishing user operations is not limited to this example. So long as control unit 310 can distinguish user operations and executes a process in accordance with an operation, control unit 310 may carry out any method.

Control unit 310 executes different processes depending on whether a user operation is a tap operation or a drag operation. Control unit 310 determines whether a user operation is a tap operation (step S5), and if the user operation is a drag operation instead of a tap operation (step S5: NO), causes a whole screen to scroll (step S6). In this case, control unit 310 changes the display positions of the bookmark icons and the dialog box while maintaining the relative positional relationship between them. Therefore, in this case, the dialog box does not disappear from view and remains to be displayed.

On the other hand, if the user operation is a tap operation (step S5: YES), control unit 310 executes a process in accordance with a position at which the tap operation was performed. For example, in a case where the position at which the tap operation was performed is within a display area of a dialog box (step S7: YES), control unit 310 executes a process in accordance with the position (step S8). For example, if the deletion button in the dialog box is selected, control unit 310 rewrites the setting information, and causes the bookmark icon relating to the deleted bookmark and the dialog box corresponding thereto to disappear. Further, if a portion of the dialog box displaying a display name or a URL is selected, control unit 310 causes a screen for editing the information to be displayed.

In a case where the position at which the tap operation was performed is not within the display area of the dialog box (step S7: NO), control unit 310 determines further whether the position is within a display area of a bookmark icon (step S9). If it is determined that the tap operation was performed at a position within the display area of a bookmark icon (step S9: YES), control unit 310 executes a process in accordance with the position at which the tap operation was performed (step S10).

In step S10, control unit 310 executes different processes depending on whether the bookmark icon present at the position at which the tap operation was performed is the selected bookmark icon (namely, the bookmark icon whose option region is inverse-displayed in FIG. 7). In addition, control unit 310 executes different processes depending on whether the position at which the tap operation was performed is in a link region or in an option region.

In a case where the position at which the tap operation was performed is in a link region, control unit 310 executes a process for displaying a webpage corresponding to the link region. Specifically, control unit 310 identifies the URL of the webpage based on the setting information, and, via network communication unit 340, acquires from an external server device data necessary for displaying the webpage. Such data may include a style sheet, image data, script, and so on, in addition to the webpage data written in a markup language such as HTML (Hyper Text Markup Language).

In a case where the position at which the tap operation was performed is in an option region, control unit 310 causes a dialog box to be displayed or disappear. Specifically, in a case where the option region of the selected bookmark icon is selected again, control unit 310 executes a process for causing the currently displayed dialog box to disappear, and causing the arrangement of the bookmark icons to revert to the original arrangement (the arrangement before the dialog box is displayed; namely, the arrangement shown in FIG. 5). Further, when, in a state where a bookmark icon is selected and a dialog box is displayed, an option region of a bookmark icon other than the selected bookmark icon is selected, control unit 310 causes the currently displayed dialog box to disappear and a dialog box corresponding to the newly selected bookmark icon to be displayed. It is to be noted here that the process for causing the currently displayed dialog box to disappear is the same as the process performed when an option region of a selected bookmark icon is selected again, and the process for causing a new dialog box to be displayed is the same as that of step S3.

In a case where the position at which the tap operation was performed is nether within the display area of a dialog box nor within the display area of a bookmark icon (step S9: NO), control unit 310 executes a process for causing the currently displayed dialog box to disappear (step S11). Further, in addition to causing the dialog box to disappear, control unit 310 executes a process for causing the arrangement of the bookmark icons to revert to the original arrangement (step S12), as in the process explained relative to step S10.

As is describe in the foregoing, in display system 10 according to the present exemplary embodiment, it is possible to display a dialog box so as not to overlap bookmark icons. Therefore, it is possible to prevent display of a bookmark icon from being interfered by a dialog box, which could overlap the bookmark icon if the present invention were not applied, and accordingly, it is possible to prevent operation of a bookmark icon from being interfered by display of a dialog box.

Further, in a display system 10, a user is allowed to perform, in a state where a dialog box is displayed, an operation (such as a drag operation for scrolling the screen, a tap operation for selecting a link, and so on) other than those for the dialog box. Further, a user is required to perform a single operation to execute both a process for causing a dialog box to disappear and a process for causing another dialog box to be displayed. Thus, a user can perform various operations while a dialog box is displayed.

MODIFICATIONS

The exemplary embodiment described in the foregoing is one embodiment for carrying out the present invention. The present invention is not limited to the exemplary embodiment, and can be carried out in other embodiments, as shown by the following modifications. It is to be noted that multiple modifications may be combined as required in carrying out the invention.

Modification 1

The size of a dialog box does not have to be fixed, and may vary depending on an amount of information displayed therein. In a case where the size of a dialog box is variable, an amount of movement of each bookmark icon that is caused to move in response to display of a dialog box also changes as appropriate.

Figure 9:
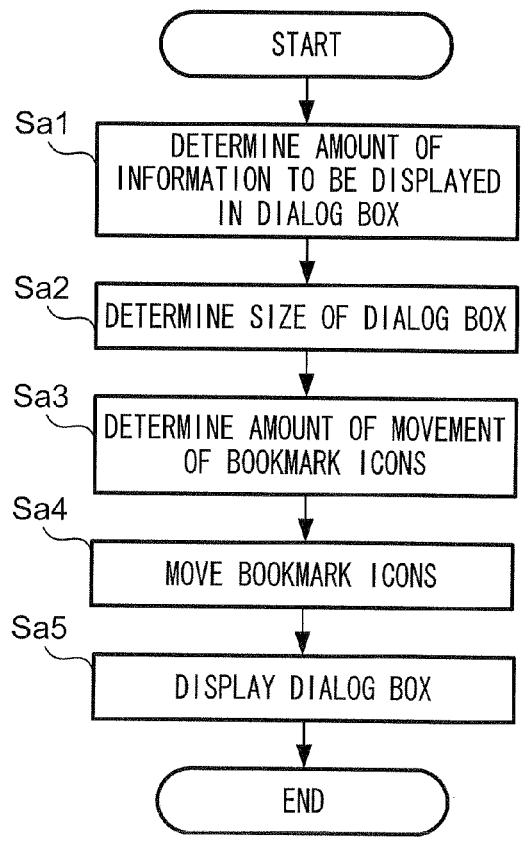
FIG. 9 is a flowchart showing a process for displaying a dialog box.

FIG. 9 is a flowchart showing a process for displaying a dialog box in this example. In a case where the size of a dialog box is variable, the process shown in FIG. 9 is executed in place of the process of steps S2 and S3 in FIG. 8. In this example, control unit 310 reads out setting information corresponding to a bookmark icon for which a tap operation was performed, and determines an amount of information to be displayed in a dialog box corresponding to the bookmark icon (step Sa1). Control unit 310 can determine an amount of information displayed in the dialog box based on an image size (an area, a number of pixels), a number of characters to be displayed, etc. Then, based on the information determined in step Sa1, control unit 310 determines the size of the dialog box (step Sa2), and determines an amount of movement (i.e., travel distance) of each bookmark icon based on the size of dialog box (step Sa3). After determining the size of the dialog box and the amount of movement of each bookmark icon, control unit 310 causes the bookmark icons to move while causing the dialog box to be displayed in accordance with the determined information (step Sa4, Sa5).

It may be possible that a dialog box has a fixed size even if an amount of information to be displayed in the dialog box may vary. For example, by causing only a portion of information to be displayed in a dialog box at a time and scrolling the information displayed in the dialog box in response to a drag operation, it is possible to display information other than the portion of information, whereby various amounts of information can be displayed even when the dialog box has a fixed size.

Modification 2

In the present invention, multiple dialog boxes may be displayed simultaneously. Namely, the number of dialog boxes displayed does not have to be limited as in the foregoing exemplary embodiment where when a dialog box is to be displayed in a state where another dialog box is already displayed, the already-displayed dialog box is caused to disappear, so that only one dialog box is selectively displayed.

For example, if bookmark icon Im1D is selected in the example shown in FIG. 7A, control unit 310 changes at least a portion of an arrangement of bookmark icons and causes dialog box Im2D to be displayed. For example, control unit 310 causes bookmark icons Im1E and Im1F to move downward, and causes dialog box Im2D to be displayed between bookmark icons Im1C, Im1D and bookmark icons Im1E, Im1F. In doing so, control unit 310 may reduce the size of each dialog box Im2A, Im2D, so that both dialog boxes Im2A and Im2D can be displayed simultaneously (namely, without being scrolled out of view). At this time, control unit 310 may or may not change the display position of bookmark icon Im1D.

Figure 10A:
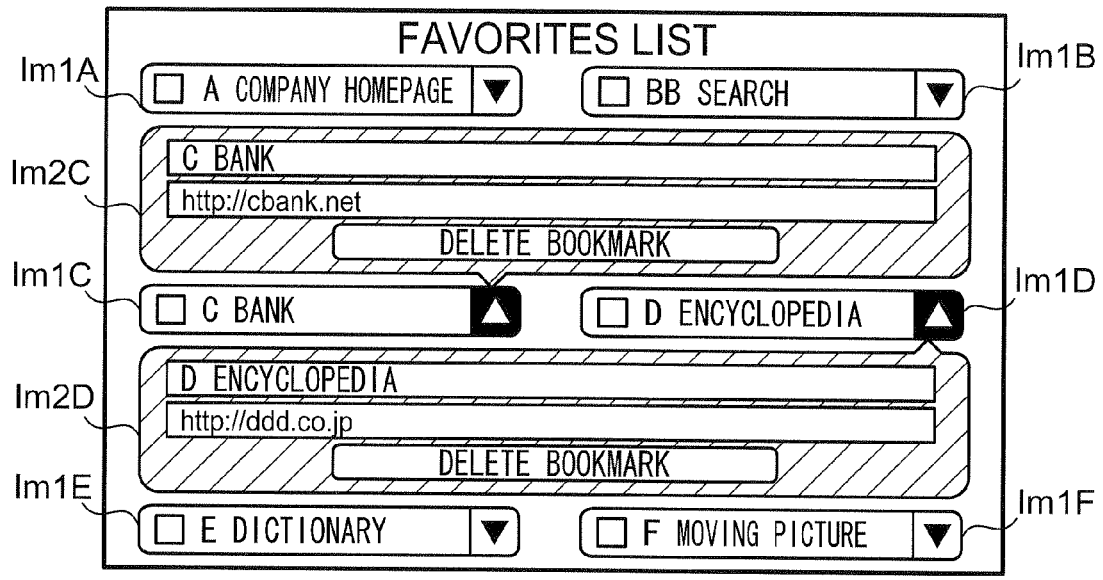
FIGS. 10A and 10B are diagrams showing examples of display of multiple dialog boxes.
Figure 10B:
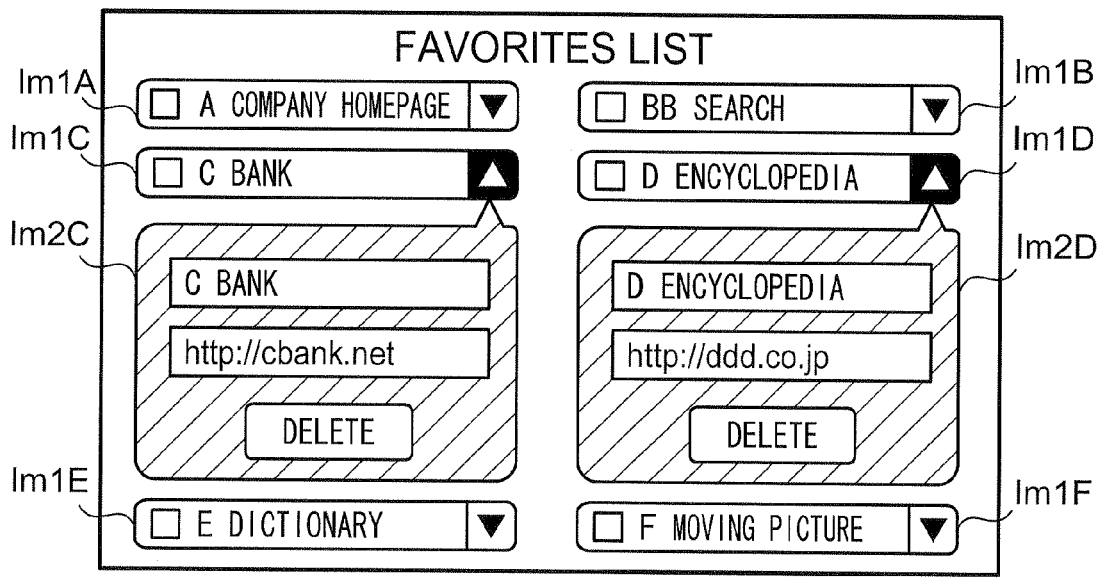

FIGS. 10A and 10B are diagrams showing examples of display of multiple dialog boxes. FIG. 10A shows an example of a state where bookmark icons Im1C and Im1D are selected, and dialog boxes Im2C and Im2D are displayed. In this example, dialog boxes Im2C and Im2D each have a vertical size smaller than that of the dialog boxes shown in FIG. 7. Further, FIG. 10B shows another example of the state where bookmark icons Im1C and Im1D are selected, and dialog boxes Im2C and Im2D are displayed. In this example, dialog boxes Im2C and Im2D each have a horizontal size smaller than that of the dialog boxes shown in FIG. 7.

Modification 3

Scrolling of an image (step S6 in FIG. 8) may be carried out in response to a drag operation at a specific position in the screen, instead of a drag operation at any position in the screen. It is to be note here that the specific position refers to, for example, a portion serving as a so-called knob (thumb) of a scroll bar.

Modification 4

In the present invention, a first image is not limited to a bookmark icon. Also, a second image is not limited to a dialog box. For example, a first image may represent a title of a music album or a jacket image of the music album. In this case, a second image may include titles of multiple musical pieces constituting the music album, for example. A user can select a title of a musical piece, so that the musical piece corresponding to the selected title is played.

Alternatively, a first image may represent a title of a game or a package image (or a game screen image) of the game. In this case, a second image may include one or more images each indicating a set of saved data representing a state of play of the game. In this example, a user may select an image indicating a set of saved data, whereby the set of saved data indicated by the selected image is read out and the game is restarted from the state at the time the data was saved.

Modification 5

In the present invention, an operation for causing an image to be displayed or to disappear is not limited to a touch operation. For example, the present invention may be configured to display a cursor (or a pointer) in a screen, whereby a user operates a cross key or a slide pad (or touch pad) to move the display position of the cursor, and presses a predetermined key to select an image (first image or second image) on which the cursor is positioned.

Modification 6

The present invention does not have to be carried out in a display system including main device 300 and controller 100 or a display system (display system 10) further including monitor 200, but also can be carried out in an information-processing device (e.g., a so-called tablet terminal) including integrally a configuration corresponding to main device 300 and a configuration corresponding to controller 100. Further, the display of the present invention does not have to be of a shape to be held with both hands, but may be of such a shape that it is to be held by a single hand, or may be adapted to be placed on a desk or the like when operated. The information-processing device of the present invention does not have to have a game function.

Further, the present invention may be carried out not only as an information-processing device or a display system as described in the foregoing, but also as a displaying method for causing a first image and a second image to be displayed or an information-processing program for executing such a displaying method. Furthermore, the information-processing program of the present invention may be stored in a storage medium such as an optical disk or a semiconductor memory, or may be downloaded to an information-processing device via a network such as the Internet.

The foregoing description of the embodiments of the present invention is provided for purposes of illustration and description, and is in no way to be taken as either exhaustive or specifically limitative of the present invention; and it will be obvious to those skilled in the art that a wide range of modifications and variations can be applied to the invention described in the exemplified embodiments, with such embodiments having been chosen merely with a view to providing a clear explanation of the principles of the present invention and its range of practical application, thereby to enable others skilled in the art to understand the invention in the context of a variety of embodiments, which can be adopted in the scope of the invention so as to best suit a contemplated use. The scope of the invention is intended to be defined by the claims that follow and equivalents thereof.

What is claimed is:

1. An information-processing device comprising:
   a first display controller configured to display multiple first images in a predetermined arrangement on a display;
   a second display controller configured to, upon receipt of a first operation for one of the multiple first images, change at least part of an arrangement of the multiple first images from the predetermined arrangement, and display a second image associated with the first image, for which the first operation was received, on the display so as not to overlap the multiple first images;
   an execution unit configured to, upon receipt of a second operation for the second image while the second image is displayed, execute a process in accordance with the second operation; and
   a third display controller configured to, upon receipt of a third operation while the second image is displayed, cause the second image to disappear, and display the multiple first images on the display such that the arrangement of the multiple first images reverts to the predetermined arrangement.

2. The information-processing device according to claim 1, wherein, upon receipt of the first operation, the second display controller is configured to change an arrangement of at least some of the first images other than the first image, for which the first operation was received, from the predetermined arrangement.

3. The information-processing device according to claim 2, wherein upon receipt of the first operation, the second display controller is configured to display the second image in the vicinity of the first image, for which the first operation was received, and change the arrangement of at least some of the first images other than the first image, for which the first operation was received, from the predetermined arrangement, such that the at least some of the first images moves away from the first image, for which the first operation was received.

4. The information-processing device according to claim 1, wherein, in a case where the third operation received while the second image is displayed is for the second image or for the first image corresponding to the second image, the third display controller is configured to cause the second image to disappear and display the multiple first images on the display such that the arrangement of the multiple first images reverts to the predetermined arrangement.

5. The information-processing device according to claim 1, wherein in a case where the third operation received while the second image is displayed is for a predetermined region other than a region in which the second image or any of the multiple first images is displayed, the third display controller is configured to cause the second image to disappear and display the multiple first images on the display such that the arrangement of the multiple first images reverts to the predetermined arrangement.

6. The information-processing device according to claim 1, wherein upon receipt of a third operation for the first image while the second image is displayed, the execution unit is configured to carry out a process in accordance with the third operation.

7. The information-processing device according to claim 1, wherein upon receipt of a third operation for another one of the first images while the second image associated with the first image, for which the first operation was received, is displayed, the second display controller is configured to maintain display of the second image, while changing further at least part of the arrangement of the multiple first images, and displaying another second image associated with the first image, for which the third operation was received, on the display so as not to overlap the multiple first images.

8. The information-processing device according to claim 1, wherein upon receipt of a third operation for another one of the first images while the second image associated with the first image, for which the first operation was received, is displayed, the second display controller is configured to cause the second image to disappear, and display another second image associated with the first image, for which the third operation was received, on the display so as not to overlap the multiple first images.

9. The information-processing device according to claim 1, wherein
upon receipt of a third operation for one of the multiple first images displayed on the display, the second display controller is configured to display a part of information on the displayed in a second image associated with the first image, for which the third operation was received, and, upon receipt of a fourth operation for the second image in which a part of information is displayed, the second display controller is configured to display another part of the information on the display.

10. The information-processing device according to claim 5, wherein upon receipt of a fourth operation of touching a predetermined position in the predetermined region, the third display controller is configured to cause the second image to disappear, and display the multiple first images on the display such that the arrangement of the multiple first images reverts to the predetermined arrangement, while upon receipt of a fifth operation for the predetermined region, the fifth operation being different from the fourth operation and in which a position of touching changes over time, the third display controller is not configured to cause the second image to disappear.

11. An image-displaying method comprising:
displaying multiple first images in a predetermined arrangement on a display;
upon receipt of a first operation for one of the multiple first images, changing at least part of an arrangement of the multiple first images from the predetermined arrangement, and displaying a second image associated with the first image, for which the first operation was received, on the display so as not to overlap the multiple first images;
upon receipt of a second operation for the second image while the second image is displayed, executing a process in accordance with the second operation; and
upon receipt of a third operation while the second image is displayed, causing the second image to disappear, and displaying the multiple first images on the display such that the arrangement of the multiple first images reverts to the predetermined arrangement.

12. A non-transient computer-readable storage medium storing a program that causes a computer to execute:
displaying multiple first images in a predetermined arrangement on a display;
upon receipt of a first operation for one of the multiple first images, changing at least part of an arrangement of the multiple first images from the predetermined arrangement, and displaying a second image associated with the first image, for which the first operation was received, on the display so as not to overlap the multiple first images;
upon receipt of a second operation for the second image while the second image is displayed, executing a process in accordance with the second operation; and
upon receipt of a third operation while the second image is displayed, causing the second image to disappear, and displaying the multiple first images on the display such that the arrangement of the multiple first images reverts to the predetermined arrangement.

13. A display system comprising:
a display having a display region for displaying an image;
a processing system, including a processor, the processing system being configured to:
control a first display to display multiple first images in a predetermined arrangement on the display;
control a second display to, upon receipt of a first operation for one of the multiple first images, change at least part of an arrangement of the multiple first images from the predetermined arrangement, and display a second image associated with the first image, for which the first operation was received, on the display so as not to overlap the multiple first images; and
execute, upon receipt of a second operation for the second image while the second image is displayed, a process in accordance with the second operation; and
control a third display to, upon receipt of a third operation while the second image is displayed, cause the second image to disappear, and display the multiple first images on the display such that the arrangement of the multiple first images reverts to the predetermined arrangement.

14. An information-processing device comprising:
a first display controller configured to display multiple first images in a predetermined arrangement on a display;
a second display controller configured to, upon receipt of a first operation for one of the multiple first images, change at least part of an arrangement of the multiple first images from the predetermined arrangement, and display a second image associated with the first image, for which the first operation was received, on the display so as not to overlap the multiple first images; and an execution unit configured to, upon receipt of a second operation for the second image while the second image is displayed, execute a process in accordance with the second operation, wherein:

upon receipt of a third operation for another one of the first images while the second image associated with the first image, for which the first operation was received, is displayed, the second display controller is configured to cause the second image to disappear, and display another second image associated with the first image, for which the third operation was received, on the display so as not to overlap the multiple first images.

15. An image-displaying method comprising:

displaying multiple first images in a predetermined arrangement on a display;

upon receipt of a first operation for one of the multiple first images, changing at least part of an arrangement of the multiple first images from the predetermined arrangement, and displaying a second image associated with the first image, for which the first operation was received, on the display so as not to overlap the multiple first images;

upon receipt of a second operation for the second image while the second image is displayed, executing a process in accordance with the second operation, wherein:

upon receipt of a third operation for another one of the first images while the second image associated with the first image, for which the first operation was received, is displayed, the second image is caused to disappear, and another second image is displayed associated with the first image, for which the third operation was received, on the display so as not to overlap the multiple first images.

16. A non-transient computer-readable storage medium storing a program that causes a computer to execute:

displaying multiple first images in a predetermined arrangement on a display;

upon receipt of a first operation for one of the multiple first images, changing at least part of an arrangement of the multiple first images from the predetermined arrangement, and displaying a second image associated with the first image, for which the first operation was received, on the display so as not to overlap the multiple first images;

upon receipt of a second operation for the second image while the second image is displayed, executing a process in accordance with the second operation, wherein:

upon receipt of a third operation for another one of the first images while the second image associated with the first image, for which the first operation was received, is displayed, the second image is caused to disappear, and another second image is displayed associated with the first image, for which the third operation was received, on the display so as not to overlap the multiple first images.

17. An information-processing device comprising:

a first display controller configured to display multiple first images in a predetermined arrangement on a display;

a second display controller configured to, upon receipt of a first operation for one of the multiple first images, change at least part of an arrangement of the multiple first images from the predetermined arrangement, and display a second image associated with the first image, for which the first operation was received, on the display so as not to overlap the multiple first images;

an execution unit configured to, upon receipt of a second operation for the second image while the second image is displayed, execute a process in accordance with the second operation; and a third display controller configured to, upon receipt of a third operation while the second image is displayed, cause the second image to disappear, and display the multiple first images on the display such that the arrangement of the multiple first images reverts to the predetermined arrangement, wherein:

the second display controller is configured to change a size of the second image depending on an amount of information to be displayed in the second image.

* * * * *